US010451343B2

(12) United States Patent
Lee et al.

(10) Patent No.: US 10,451,343 B2
(45) Date of Patent: Oct. 22, 2019

(54) ICE THERMAL STORAGE TANK AND WATER COOLER HAVING THE SAME

(71) Applicant: COWAY CO., LTD., Chungcheongnam-do (KR)

(72) Inventors: Soo-Young Lee, Seoul (KR); Hee-Do Jung, Seoul (KR); Jin-Pyo Hong, Seoul (KR); Yong-Bum Kim, Seoul (KR); Tae-Yong Son, Seoul (KR); Kyung-Heon Lee, Seoul (KR); Hyoung-Min Moon, Seoul (KR); Min-Sub Song, Seoul (KR)

(73) Assignee: Coway Co., Ltd (KR)

( * ) Notice: Subject to any disclaimer, the term of this patent is extended or adjusted under 35 U.S.C. 154(b) by 686 days.

(21) Appl. No.: 14/348,227

(22) PCT Filed: Sep. 27, 2012

(86) PCT No.: PCT/KR2012/007831
§ 371 (c)(1),
(2) Date: Mar. 28, 2014

(87) PCT Pub. No.: WO2013/048149
PCT Pub. Date: Apr. 4, 2013

(65) Prior Publication Data
US 2014/0223942 A1    Aug. 14, 2014

(30) Foreign Application Priority Data

Sep. 30, 2011 (KR) .................. 10-2011-0100289
Sep. 20, 2012 (KR) .................. 10-2012-0104690

(51) Int. Cl.
*F25D 31/00* (2006.01)
*F28D 20/02* (2006.01)
(Continued)

(52) U.S. Cl.
CPC .......... *F25D 31/002* (2013.01); *F25D 31/003* (2013.01); *F28D 20/02* (2013.01);
(Continued)

(58) Field of Classification Search
CPC ...... F25D 31/002; F25D 31/003; F28D 20/02; F28D 20/028; F28D 2020/0078; F25B 21/02; F25B 2700/21171
See application file for complete search history.

(56) References Cited

U.S. PATENT DOCUMENTS 5,649,431 A * 7/1997 Schroeder, Jr. ....... F24F 5/0017
62/434
7,571,621 B2   8/2009 Dietschi et al.
(Continued)

FOREIGN PATENT DOCUMENTS

CN     2551956     5/2003
CN     2625811     7/2004
(Continued)

OTHER PUBLICATIONS

"Machine Translation of 09-170852 A, Furuhashi, Mar. 1995".*
(Continued)

*Primary Examiner* — Frantz F Jules
*Assistant Examiner* — Martha Tadesse
(74) *Attorney, Agent, or Firm* — The Farrell Law Firm, P.C.

(57) ABSTRACT

There are provided an ice thermal storage tank having excellent cold water generation efficiency and having a considerably reduced size, and a water cooler having the same. The ice thermal storage tank includes: a tank body accommodating an ice storage liquid cooled according to an ice thermal storage scheme; a cold water generation unit heat-exchanging introduced water with the cooled ice storage liquid to generate cold water; and a circulation unit
(Continued)

extracting the ice storage liquid accommodated in the tank body to circulate it within the tank body. The water cooler includes: the thermal storage tank cooling water supplied from the outside; and a water dispensing unit dispensing cooled water from the ice thermal storage tank. Since an ice storage liquid is circulated without using a stirrer, the size of an ice thermal storage tank can be remarkably reduced, and thus, a water cooler is reduced in size.

8 Claims, 7 Drawing Sheets

(51) Int. Cl.
 *F28D 20/00* (2006.01)
 *F25B 21/02* (2006.01)
(52) U.S. Cl.
 CPC ............ *F28D 20/028* (2013.01); *F25B 21/02* (2013.01); *F25B 2700/21171* (2013.01); *F28D 2020/0078* (2013.01); *Y02E 60/145* (2013.01)

(56) References Cited

U.S. PATENT DOCUMENTS

| | | | |
|---|---|---|---|
| 2004/0134932 A1* | 7/2004 | Lobdell | B67D 3/0009 222/146.5 |
| 2006/0168981 A1 | 8/2006 | Mager et al. | |
| 2009/0308494 A1* | 12/2009 | Linn | B67D 1/0014 141/391 |
| 2010/0101767 A1* | 4/2010 | Furui | F24D 3/087 165/163 |

FOREIGN PATENT DOCUMENTS

| | | | | |
|---|---|---|---|---|
| CN | 1759290 | | 4/2006 | |
| CN | 2901214 | | 5/2007 | |
| CN | 201081480 | | 7/2008 | |
| CN | 201181170 | | 1/2009 | |
| CN | 201488588 | | 5/2010 | |
| EP | 0 866 028 | | 9/1998 | |
| EP | 2363188 A2 | * | 9/2011 | ................ C02F 1/68 |
| GB | 1 283 194 | | 7/1972 | |
| GB | 1283194 | * | 7/1972 | ............. F25D 17/02 |
| GB | 1283194 A | * | 7/1972 | ........... F25D 31/003 |
| JP | 09-170852 A | * | 3/1995 | |
| JP | 07055302 A | * | 3/1995 | |
| JP | 09126621 | | 5/1997 | |
| JP | 09170852 A | * | 6/1997 | |
| JP | 02850264 | | 1/1999 | |
| JP | 2001021283 | | 1/2001 | |
| KR | 200377788 | | 3/2005 | |

OTHER PUBLICATIONS

PCT/ISA/237 Written Opinion issued on PCT/KR2012/007831 (pp. 7).
European Search Report dated Jul. 13, 2015 issued in counterpart application No. 12837490.7-1602, 6 pages.
Chinese Office Action dated Jul. 28, 2015 issued in counterpart application No. 201280047641.1, 26 pages.

* cited by examiner

[Fig. 5]
(a)
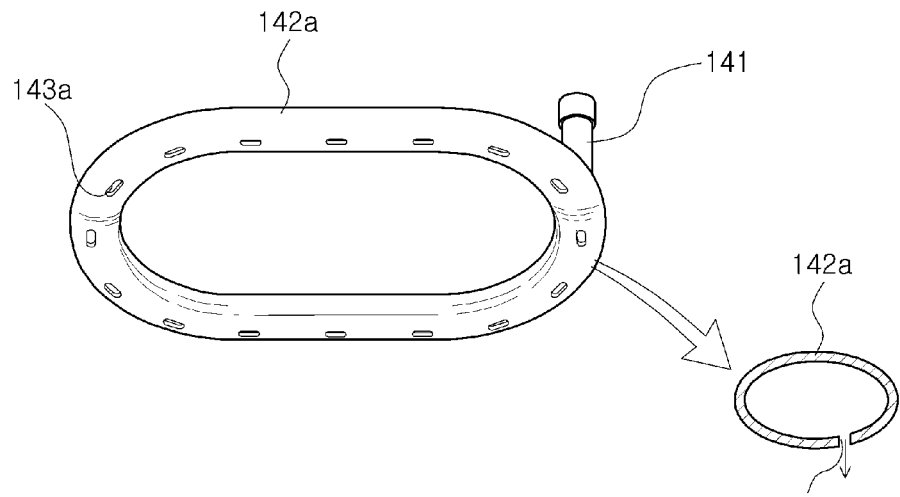
(b)
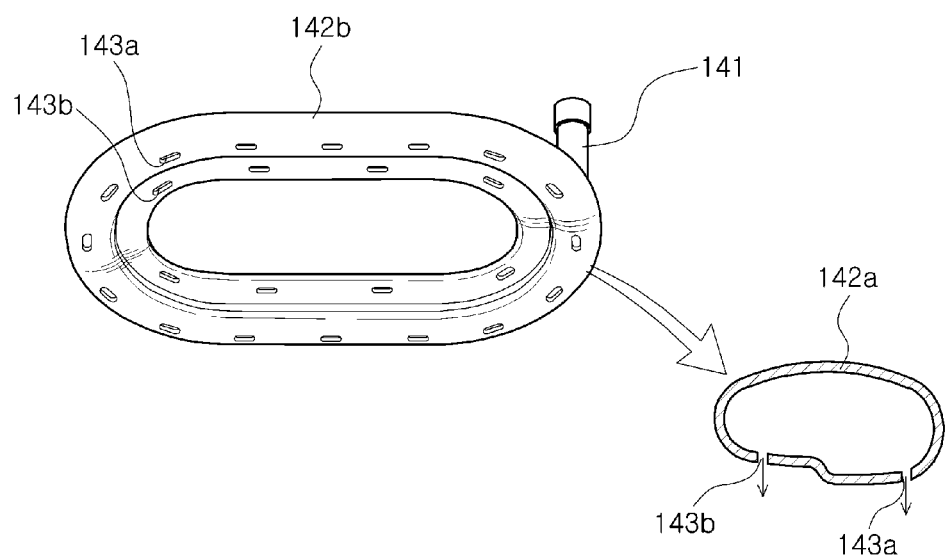

[Fig. 6]
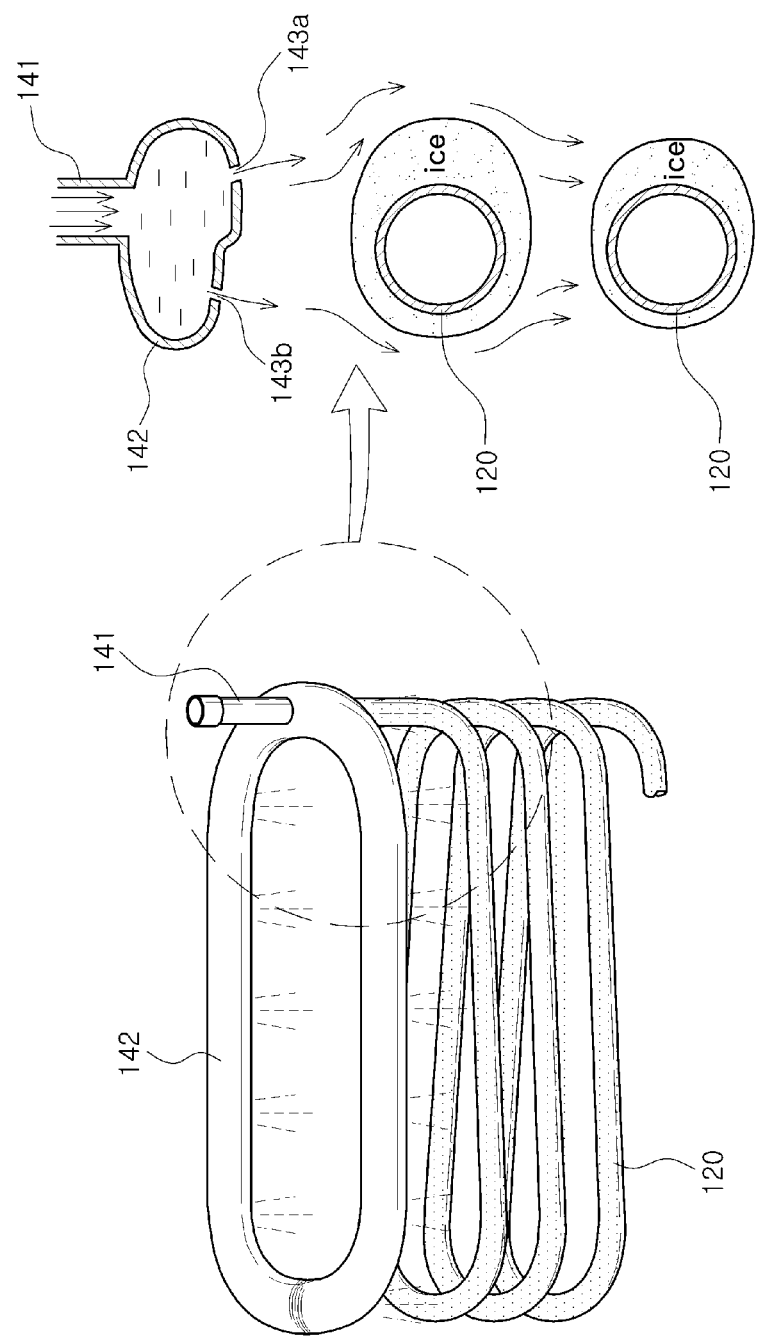

[Fig. 7]
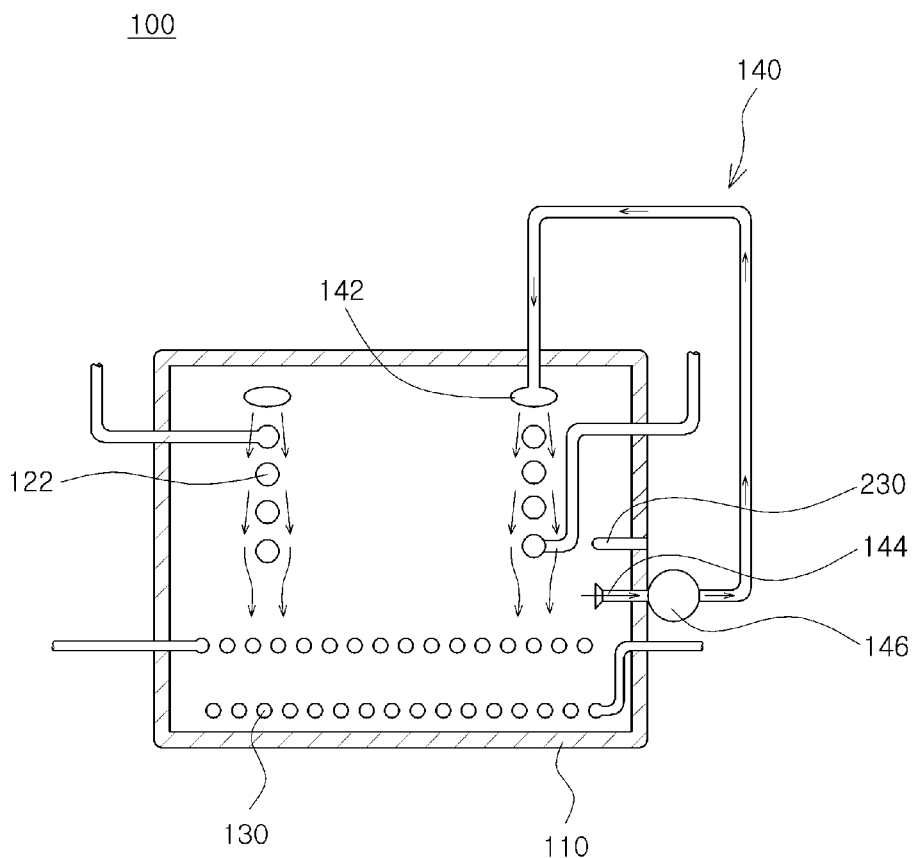

ICE THERMAL STORAGE TANK AND WATER COOLER HAVING THE SAME

This application is a National Phase Entry of PCT International Application No. PCT/KR2012/007831 filed Sep. 27, 2012, and claims priority to Korean Patent Application Nos. 10-2011-0100289 and 10-2012-0104690 filed with the Korean Intellectual Property Office on Sep. 30, 2011, and on Sep. 20, 2012, respectively, the content of each of which is incorporated herein by reference.

TECHNICAL FIELD

The present invention relates to an ice thermal storage tank and a water cooler having the same, and more particularly, to an ice thermal storage tank having excellent cold water generation efficiency and a considerably reduced size, and a water cooler having the same.

BACKGROUND ART

In general, a water cooler is a device cooling water supplied from a faucet or a water dispenser and providing the same to a user. Such a water cooler may be installed in a water purifier, a water carbonator, a water heater/chiller, and the like.

A method for generating cold water includes a direct cooling method using a cold water tank and an ice thermal storage scheme using heat exchange with ice.

Here, according to the ice thermal storage scheme, a cold water line is installed to pass through an ice storage tank in which ice or a cold fluid is stored to allow the cooled heat transmission material accommodated within the ice storage tank to be heat-exchanged with room temperature water passing through the cold water line to generate cold water.

Meanwhile, FIG. 1 schematically illustrates a configuration of a related art ice thermal storage type water cooler, which includes an evaporator 30 connected to a cooling device 20 and having a refrigerant circulated therein, a cold water line 40 accommodating room temperature water to generate cold water, and a stirrer 50 within an ice storage tank 10 accommodating an ice storage liquid.

Here, the stirrer 50 includes a motor device and a propeller to circulate the ice storage liquid accommodated in the ice storage tank 10 to transfer cold ice storage liquid in the vicinity of the evaporator 30 to the cold water line 40 and melt ice formed on a surface of the evaporator 30 by using a flow of the ice storage liquid. Here, as ice formed on the surface of the evaporator 30 is melted, it absorbs latent heat to potentially lower a temperature of the ice storage liquid.

However, the related art water cooler including the stirrer 50 has problems in that noise is generated due to the actuation of the stirrer 50, ice storage heat may not be effectively convected, the ice on the surface of the evaporator 30 may not be effectively melted, and the installation of the stirrer 50 increases a size of the device.

DISCLOSURE OF INVENTION

Technical Problem

An aspect of the present invention provides a micro-ice thermal storage tank using an ice storage liquid circulation system having a simple structure, and a water cooler having the same.

An aspect of the present invention also provides an ice thermal storage tank capable of making the best use of the latent heat of ice, and a water cooler having the same.

An aspect of the present invention also provides an ice thermal storage tank without a stirrer, and a water cooler having the same.

An aspect of the present invention also provides an ice thermal storage tank having a simplified structure incurring low manufacturing costs, and a water cooler having the same.

An aspect of the present invention also provides an ice thermal storage tank capable of effectively controlling a cooling system for satisfying a desired cold water temperature and saving energy, and a water cooler having the same.

Solution to Problem

According to an aspect of the present invention, there is provided an ice thermal storage tank including: a tank body accommodating an ice storage liquid cooled according to an ice thermal storage scheme; a cold water generation unit heat-exchanging introduced water with the cooled ice storage liquid to generate cold water; and a circulation unit extracting the ice storage liquid accommodated in the tank body to circulate it within the tank body.

The circulation unit may include: a jetting unit for jetting the ice storage liquid to the tank body.

The circulation unit may include a pump pumping the ice storage liquid to the jetting unit.

The jetting unit may include: a body having an inlet through which the ice storage liquid is introduced; and a plurality of injection nozzles formed on the body.

The ice thermal storage tank may further include: a cooling device connected to the tank body to cool the ice storage liquid according to an ice thermal storage scheme.

The cooling device may include an evaporator in which a refrigerant flows.

The cooling device may include a thermoelectric module.

The plurality of injection nozzles may provide the ice storage liquid to the cooling device connected to the tank body to cool the ice storage liquid according to the ice thermal storage scheme.

The injection nozzle may provide the ice storage liquid to an outer circumferential surface of the evaporator included in the cooling device connected to the tank body to cool the ice storage liquid according to the ice thermal storage scheme, and may be formed to have a spiral shape.

The injection nozzle may provide the ice storage liquid to an outer circumferential surface and an inner circumferential surface of the evaporator included in the cooling device connected to the tank body to cool the ice storage liquid according to the ice thermal storage scheme, and may be formed to have a spiral shape.

The injection nozzle may provide the ice storage liquid to the center of the evaporator included in the cooling device connected to the tank body to cool the ice storage liquid according to the ice thermal storage scheme, and may be formed to have a spiral shape.

The injection nozzle may have a size ranging from 2 mm to 5 mm, and preferably, ranging from 3 mm to 4 mm.

The cold water generation unit may be disposed on a lower portion of the cooling device connected to the tank body to cool the ice storage liquid according to the ice thermal storage scheme, and the jetting unit may be disposed on an upper portion of the cooling device connected to the tank body to cool the ice storage liquid according to the ice thermal storage scheme.

The circulation unit may include an ice storage liquid exhaust pipe extracting the ice storage liquid, and the ice storage liquid exhaust pipe may be disposed between a bottom surface of the tank body and a lower end of the cooling device.

According to another aspect of the present invention, there is provided a water cooler including: the foregoing ice thermal storage tank cooling water supplied from the outside; and a water dispensing unit dispensing cooled water from the ice thermal storage tank.

The water cooler may further include: a temperature sensor sensing a temperature of the ice storage liquid present at a level adjacent to a level of a lower end of the cooling device connected to the tank body to cool the ice storage liquid according to the ice thermal storage scheme, from a bottom surface of the tank body of the ice thermal storage tank.

The water cooler may further include: a controller controlling a cooling function of the water cooler, and the controller may control a cooling function of the water cooler based on a temperature of the ice storage liquid sensed by the temperature sensor.

When a temperature of the ice storage liquid sensed by the temperature sensor is higher than a pre-set reference temperature, the controller may drive the cooling device, and when the temperature of the ice storage liquid sensed by the temperature sensor is lower than the pre-set reference temperature, the controller may stop driving of the cooling device.

When the cooling device is driven, the controller may supercool the ice storage liquid.

When cold water is dispensed from the water dispensing unit, the controller may circulate the ice storage liquid through the circulation unit included in the ice thermal storage tank.

When a cold water dispensing signal is received, the controller may circulate the ice storage liquid by driving the pump included in the circulation unit, and after the lapse of a certain amount of time or after a cold water temperature of the cold water generation unit included in the ice thermal storage tank is lowered to a certain temperature, the controller may allow cold water to be dispensed through the water dispensing unit.

Advantageous Effects of Invention

According to an embodiment of the present invention, since an ice storage liquid is circulated without using a stirrer, the size of an ice thermal storage tank can be markedly reduced, and thus, a water cooler can be reduced in size.

Also, according to an embodiment of the present invention, cold water generation efficiency can be markedly enhanced by jetting an ice storage liquid such that the latent heat of ice is utilized by as much as possible.

Also, according to an embodiment of the present invention, since a stirrer is not used, noise generated in driving a cooling function of a water cooler can be remarkably reduced.

Also, according to an embodiment of the present invention, a water cooler having high cold water generation efficiency can be manufactured at low cost by using a jetting unit capable of effectively jetting an ice storage liquid according to the characteristics of ice formed on the surface of an evaporator and a nozzle type.

Also, according to an embodiment of the present invention, since a cooling system of a water cooler is effectively controlled by using a temperature sensor, a cold water temperature desired by a user can be realized and energy can be saved.

Also, according to an embodiment of the present invention, since an ice storage liquid is circulated when cold water is dispensed and the circulated ice storage liquid is jetted to a cooling device, cold water generation efficiency can be further enhanced.

BRIEF DESCRIPTION OF DRAWINGS

FIG. 5 is a perspective view of another example of the jetting unit of the ice thermal storage tank of FIG. 3;

FIG. 6 is a view illustrating an operation of jetting an ice storage liquid by the jetting unit of the ice thermal storage tank of FIG. 3; and FIG. 7 is a view illustrating an operation of circulating an ice storage liquid of the ice thermal storage tank of FIG. 3.

MODE FOR THE INVENTION

The terms used in the present application are merely used to describe particular embodiments, and are not intended to limit the present invention. An expression used in the singular encompasses the expression of the plural, unless it has a clearly different meaning in the context in which it is used.

In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Embodiments of the present invention will be described with reference to the accompanying drawings.

Figure 1:
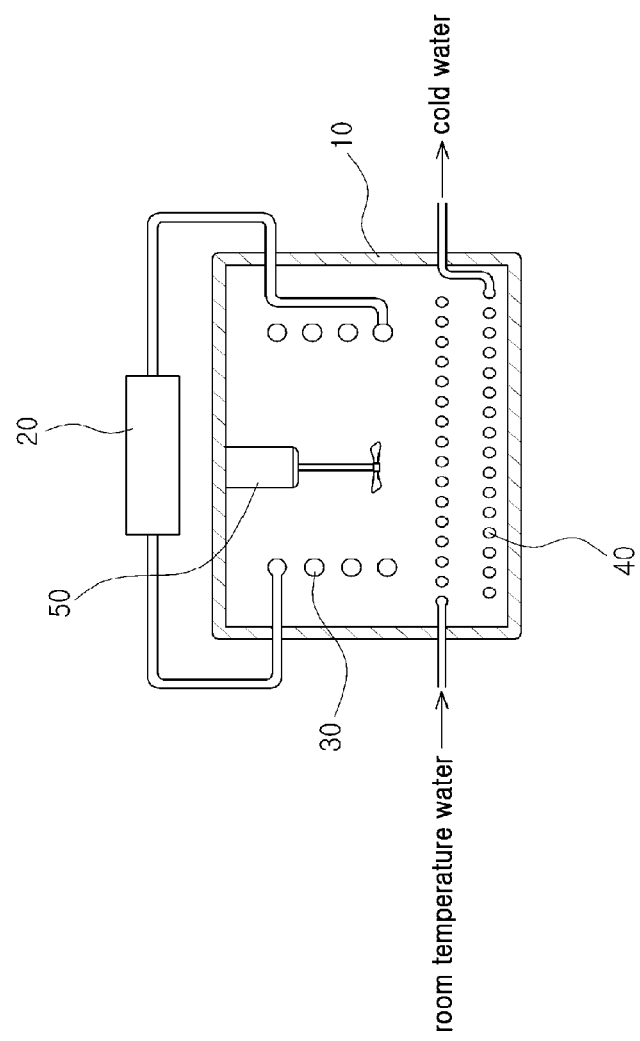
FIG. 1 is a view illustrating a configuration of a related art ice thermal storage type water cooler.
Figure 2:
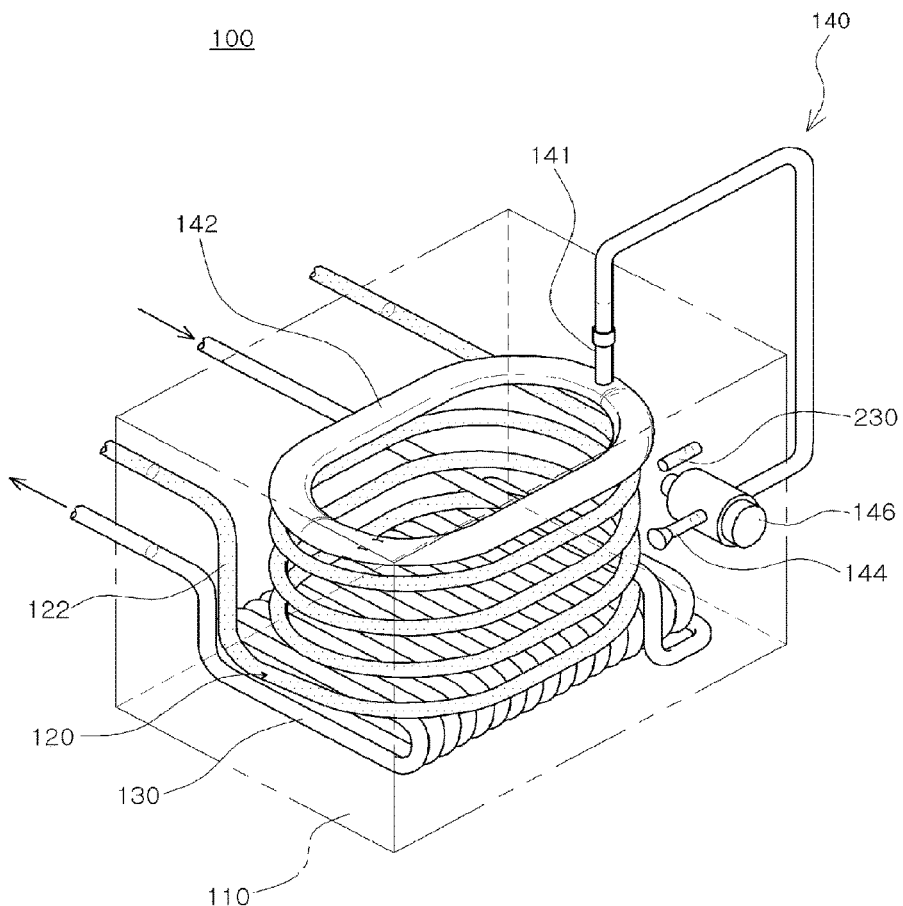
FIG. 2 is a perspective view illustrating an ice thermal storage tank according to an embodiment of the present invention.
Figure 3:
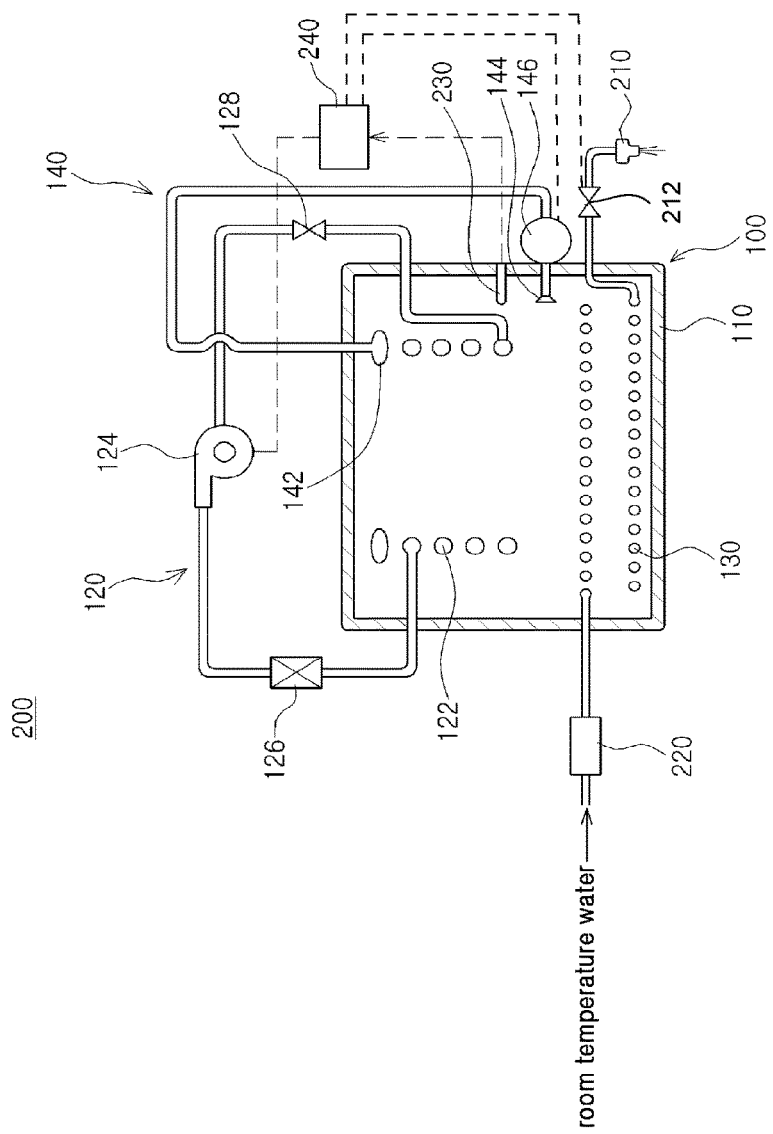
FIG. 3 is a schematic view illustrating a configuration of a water cooler having an ice thermal storage tank according to an embodiment of the present invention.

First, an ice thermal storage tank and a water cooler including the same according to embodiments of the present invention will be described with reference to FIGS. 2 and 3. Here, FIG. 2 is a perspective view illustrating an ice thermal storage tank according to an embodiment of the present invention, and FIG. 3 is a schematic view illustrating a configuration of a water cooler having an ice thermal storage tank according to an embodiment of the present invention. In order to help understand the present invention, the ice thermal storage tank and the water cooler will be described in conjunction.

First, as illustrated in FIGS. 2 and 3, an ice thermal storage tank 100 may include a tank body 110, a cooling device 120, a cold water generation unit 130, and a circulation unit 140, and may further include a pump 146 connected to the circulation unit 140.

A water cooler 200 according to an embodiment of the present invention may include the ice thermal storage tank 100 and a water dispensing unit 210, and may further include a temperature sensor 230 installed in the tank body 110 and a controller 240 connected to the temperature sensor 230.

The tank body 110 accommodates an ice storage liquid therein and connected to the cooling device 120 to cool the ice storage liquid accommodated therein according to an ice thermal storage scheme. Namely, the cooling device 120 supercools the ice storage liquid accommodated in the tank body 110 to a temperature below freezing, so ice may be generated on the circumference of the cooling device 120 while the remaining ice storage liquid may have a temperature below or close to freezing. In an embodiment of the present invention, the tank body 110 may be made of a material having excellent heat insulating characteristics and may have a box-like shape with a cover.

Meanwhile, as shown in FIG. 3, like a general cooling system, the cooling device 120 may include a compressor 124 for compressing a refrigerant, a condenser 126 for condensing the compressed refrigerant from the compressor 124, an evaporator 122 for evaporating the condensed refrigerant from the condenser 126, and an expander 128 for expanding the evaporated refrigerant from the evaporator 122.

In an embodiment illustrated in FIG. 2, the evaporator 122 may be provided within the tank body 110, may be configured as a pipe allowing a refrigerant to move therein, and may be configured such that several turns are wound in a spiral form like a spring in order to allow the refrigerant passing through the pipe to sufficiently cool the ice storage liquid.

Also, the evaporator 122 is provided in an upper portion within the tank body 110 to allow the cold water generation unit 130 to avoid a possibility of being directly frozen and rupturing, and the evaporator 122 supercools the ice storage liquid accommodated within the tank body 110.

However, the configuration of the cooling device 120 is not limited to a general cooling system in which a refrigerant flows and the evaporator 122 is provided, and may have any known configuration as long as it is connected to the tank body 110 to supercool an ice storage liquid accommodated in the tank body 110, such as a configuration including a thermoelectric module, one side of which is heated and the other side is cooled when power is applied thereto.

Meanwhile, the cold water generation unit 130 is provided within the tank body 110 and supplied with water from the outside of the tank body 110. Here, the cold water generation unit 130 may be provided with water from a water supply unit (not shown) such as a faucet or a water dispenser.

Upon receiving water, the cold water generation unit 130 may heat-exchange the ice storage liquid accommodated in the tank body 110 with water to cool the water. In this manner, the cold water generation unit 130 may generate cold water.

Here, as shown in the embodiment illustrated in FIG. 2, several turns of the cold water generation unit 130 may be configured to be wound in a spiral form like a spring to allow water to be sufficiently heat-exchanged while passing through the tank body 110.

Also, in an embodiment of the present invention, the cold water generation unit 130 may be disposed below the cooling device 120 so as not to be frozen by ice generated by the cooling device 120. When the cooling device 120 includes the evaporator 122 as in the illustrated embodiment, the cold water generation unit 130 may be disposed below the evaporator 122 so as not to be frozen by ice generated by the evaporator 122.

Meanwhile, the circulation unit 140 is configured to extract the ice storage liquid accommodated in the tank body 110 to circulate it within the tank body 110.

To this end, in an embodiment of the present invention, the circulation unit 140 may include a jetting unit 142 for jetting the ice storage liquid within the tank body 110. The circulation unit 140 extracts the ice storage liquid present in a lower portion of the tank body 110 and jets it upwardly of the tank body 110 by using the jetting unit 142, thus circulating the ice storage liquid.

In an embodiment of the present invention, the jetting unit 142 may be configured to have a tube-like shape to be overlaid on the circumference of the winding evaporator 122 included in the cooling device 120. In other words, when viewed from a plane, the jetting unit 142 may be configured such that a lower end thereof corresponds to an upper end of the evaporator 122 included in the cooling device 120.

The jetting unit 142 may be disposed on an upper portion of the cooling device 120 to jet the ice storage liquid to the entirety of the upper end portion of the cooling device 120. In the illustrated embodiment, the jetting unit 142 may be disposed on an upper portion of the evaporator 122 included in the cooling device 120 to jet the ice storage liquid to the entirety of the upper end portion of the evaporator 122.

Also, an inlet 141, through which the ice storage liquid to be circulated is introduced, may be provided on one side of the jetting unit 142, and a plurality of injection nozzles 143 may be provided on a lower portion of the jetting unit 142. The injection nozzles 143 will be described in detail with reference to FIG. 4.

Also, in an embodiment of the present invention, the circulation unit 140 may include a pump 146 for pumping the ice storage liquid to the jetting unit 142 and an ice storage liquid exhaust pipe 144 for extracting the ice storage liquid.

Here, the pump 146 may be installed outside of the tank body 110 and pump the ice storage liquid from the ice storage liquid exhaust pipe 144 to the jetting unit 142.

Ice storage liquid pumped by the pump 146 may be jetted to the ice storage liquid accommodated within the tank body 110 from the jetting unit 142 by the pumping pressure.

Meanwhile, the ice storage liquid, supercooled in the vicinity of the cooling device 120, may have a temperature lower than that of the ice storage liquid existing in a lower portion of the tank body 110 in which the cold water generation unit 130 performing heat exchanging is positioned.

Thus, in order to circulate the ice storage liquid such that the ice storage liquid in the vicinity of the cooling device 120 having a lower temperature is sent to a lower portion of the tank body 110 in which the cold water generation unit 130 is positioned and the ice storage liquid in the vicinity of the cold water generation unit 130 is sent to the vicinity of the cooling device 120, the ice storage liquid exhaust pipe 144 may be disposed between a bottom surface of the tank body 110 and a lower end of the cooling device 120. In the illustrated embodiment including the evaporator 122 in the cooling device 120, the ice storage liquid exhaust pipe 144 may be disposed between a bottom surface of the tank body 110 and a lower end of the evaporator 122.

Also, the temperature sensor 230 may be installed in the ice thermal storage tank 100 according to an embodiment of the present invention. The temperature sensor 230 may sense a temperature of the ice storage liquid accommodated within the tank body 110.

Meanwhile, in FIG. 3, the water dispensing unit 210 included in the water cooler 200 according to an embodiment of the present invention is connected to the cold water generation unit 130 so that water cooled in the cold water generation unit 130 can be dispensed by the user.

Also, in an embodiment of the present invention, a valve 212 may be provided in a path, along which cold water generated by the cold water generation unit 130 flows to the water dispensing unit 210, in order to control a movement of cold water.

The temperature sensor 230 included in the water cooler 200 according to an embodiment of the present invention may be installed in the tank body 110 in order to sense a temperature of the ice storage liquid accommodated within the tank body 110.

Meanwhile, the ice storage liquid accommodated within the tank body 110 of the ice thermal storage tank 100 according to an embodiment of the present invention may have a temperature varying according to a level of the ice storage liquid.

As the ice storage liquid is present close to the cold water generation unit 130, it significantly affects a formation of a temperature of generated cold water. Thus, in order to control the cooling device 120 based on the temperature of such an ice storage liquid, in an embodiment of the present invention, the temperature sensor 230 may be configured to sense a temperature of the ice storage liquid present at a level adjacent to a level of the lower end of the cooling device 120 from the bottom surface of the tank body 110. As shown in the illustrated embodiment, when the cooling device 120 includes the evaporator 122, the temperature sensor 230 may be configured to sense a temperature of the ice storage liquid present at a level adjacent to the level of the lower end of the evaporator 122 from the bottom surface of the tank body 110.

Meanwhile, the controller 240 included in the water cooler 200 according to an embodiment of the present invention may determine temperature data of the ice storage liquid sensed by the temperature sensor 230, and control a cooling function of the water cooler 200 based on the determined temperature. For example, when the temperature of the ice storage liquid is higher than a pre-set reference temperature, the controller 240 may drive the cooling device 120, or the compressor 124 included in the cooling device 120 in the illustrated embodiment, to perform an ice storage liquid supercooling function, and when the temperature of the ice storage liquid is lower than the reference temperature, the controller 240 may stop driving of the cooling device 120, or stop driving of the compressor 124 included in the cooling device 120 in the illustrated embodiment, to stop the ice storage liquid supercooling function.

Also, when cold water is dispensed from the water dispending unit 210, the controller 240 may circulate the ice storage liquid through the circulation unit 140. To this end, when a cold water dispensing signal is received from the user, the controller 240 may circulate the ice storage liquid by driving the pump 146 of the circulation unit 140. Thereafter, after the lapse of a certain amount of time, or when a cold water temperature of the cold water generation unit 130 is lowered a certain temperature, the controller 240 may allow cold water to be dispensed through the water dispensing unit 210.

In this manner, when the ice storage liquid is circulated through the circulation unit 140 when cold water is dispensed, a temperature of the ice storage liquid in the vicinity of the cold water generation unit 130 may be further lowered. Thus, cold water can be rapidly generated and supplied to the user.

The water cooler 200 according to an embodiment of the present invention may further include a filter unit 220 in a path supplying water. The filter unit 220 may filter water to be supplied to the cold water generation unit 130, and filtered water moves to the cold water generation unit 130. As for a configuration of the filter unit 220, various types of filters and various amounts of filters may be employed, according to specifications or performance, and a detailed description thereof will be omitted.

The structure of the jetting unit of the ice thermal storage tank according to an embodiment of the present invention will be described in detail with reference to FIGS. 4 and 5.

Figure 4:
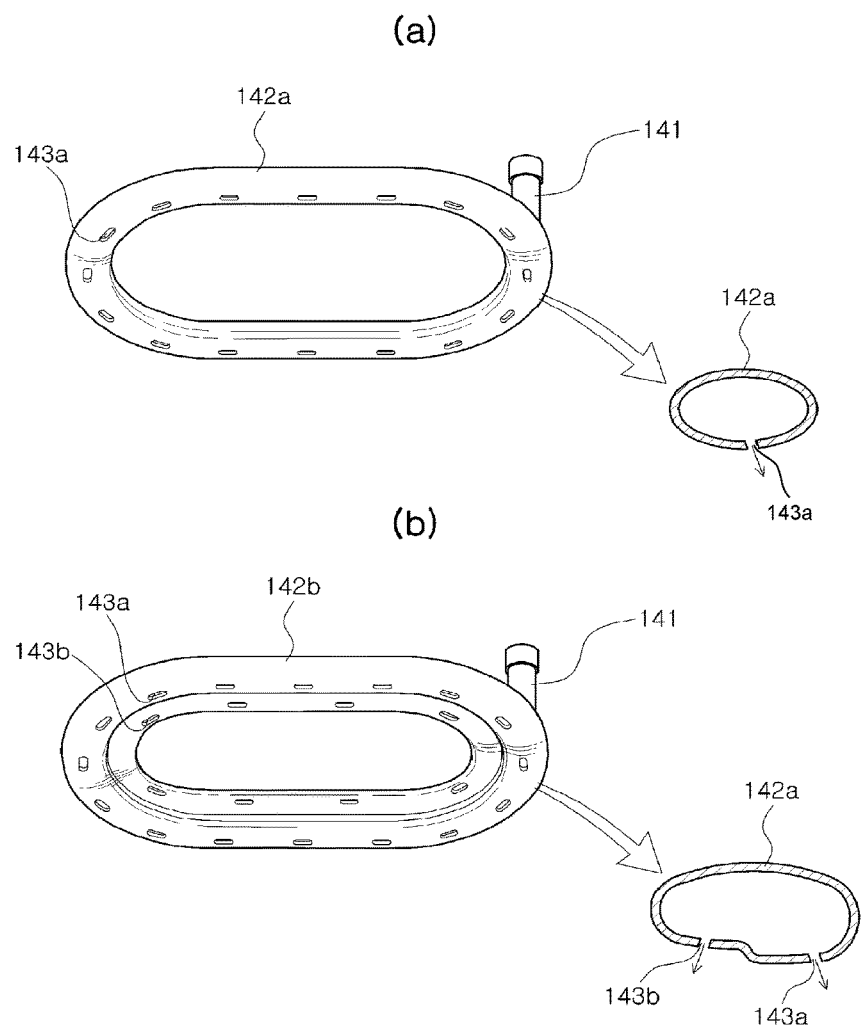
FIG. 4 is a perspective view of a jetting unit of the ice thermal storage tank of FIG. 3.

Here, FIG. 4(*a*) and FIG. 5(*a*) illustrate a jetting unit 142*a* only having outer injection nozzles 143*a* according to an embodiment of the present invention, and FIG. 4(*b*) and FIG. 5(*b*) illustrate a jetting unit 142*b* having outer injection nozzles 143*a* and inner injection nozzles 143*b* according to another embodiment of the present invention.

As illustrated in FIG. 4(*a*) and FIG. 5(*a*) according to an embodiment of the present invention, a plurality of injection nozzles 143 may be formed in a line on a lower end of the jetting unit 142*a*. Also, in an embodiment of the present invention, the injection nozzles 143*a* may provide an ice storage liquid to the cooling device 120. In the illustrated embodiment, the injection nozzles 143*a* may provide the ice storage liquid to the evaporator 122 included in the cooling device 120.

Here, as for the sections of the tube-like jetting units 142*a* illustrated in FIG. 4(*a*) and FIG. 5(*a*), in the case of FIG. 4(*a*), the injection nozzles 143*a* may be formed to be sloped outwardly from the tube, and in the case of FIG. 5(*a*), the injection nozzles 143*a* may be disposed to be adjacent to an outer side of the tube and vertical thereto, and thus, the injection nozzles 143*a* may inject a fluid to an outer side of the tube.

Accordingly, the injection nozzles 143*a* may provide the ice storage liquid to the outer circumferential surface of the evaporator 122 formed to have a spiral shape. Here, the outer circumferential surface of the evaporator 122 corresponds to an outer surface of the spiral pipe formed as the evaporator 122 is bent.

Meanwhile, in FIG. 4(*b*) and FIG. 5(*b*) according to another embodiment of the present invention, unlike the configuration of the injection nozzles 143*a* forming only the outer line as illustrated in FIG. 4(*a*) and FIG. 5(*a*), a plurality of injection nozzles 143 may be formed in outer and inner lines on a lower end of the jetting unit 142*b*.

Here, as for the section of the jetting units 142*b*, as shown in FIG. 4(*b*), the injection nozzles 143 may include an outer injection nozzle 143*a* sloped toward an outer side of the tube and an inner injection nozzle 143*b* sloped toward an inner side of the tube. Also, as shown in FIG. 5(*b*), the injection nozzles 143 may include an outer injection nozzle 143*a* disposed to be adjacent to an outer side of the tube and vertical, and an inner injection nozzle 143*b* disposed to be adjacent to the inner side of the tube and vertical.

Accordingly, the injection nozzles 143 may inject toward the outer circumferential surface and inner circumferential surface of the evaporator 122 formed to have a spiral form. Here, the inner circumferential surface of the evaporator 122 corresponds to an inner surface of the spiral pipe formed as the evaporator 122 is bent.

Besides, although not shown, the injection nozzles 143 may be included in the cooling device 120 and provide the ice storage liquid to the center of the evaporator 122 formed to have a spiral shape. The ice storage liquid injected toward the center of the evaporator 122 may flow downward of the evaporator 122 along the outer circumferential surface and the inner circumferential surface of the evaporator 122. Here, the center of the evaporator 122 corresponds to a central surface of the spiral pipe formed as the evaporator 122 is bent. In case of the tube-like jetting unit 142, the injection nozzles 143 may be disposed at the center of the tube and vertical such that a fluid can be injected to the center of the tube.

Meanwhile, if the size of the injection nozzle 143, namely, the size of the ice storage liquid injection hole, is small, a flux of the injected ice storage liquid is reduced and the injection nozzle may be frozen and blocked. Meanwhile, if the size of the injection nozzle 143 is large, a velocity of flow of the injected ice storage liquid is reduced, making it difficult for the ice storage liquid to reach a lower side of the evaporator 122.

In order to prevent this, the injection nozzle 143 may have an appropriate size. For example, the injection nozzle 143 may have a size of 2 mm to 5 mm, and preferably, 3 mm to 4 mm.

Hereinafter, an ice storage liquid jetting operation of the jetting unit of the ice thermal storage tank 100 according to an embodiment of the present invention will be described with reference to FIG. 6.

As illustrated in FIG. 6, the ice storage liquid introduced into the jetting unit 142 through the inlet 141 may be jetted through the injection nozzles 143 formed in the jetting unit 142 upon receiving pressure from a pump (not shown).

Here, the jetted ice storage liquid may be jetted to ice generated on the surface of the evaporator 122 as shown in the partially enlarged view.

Here, the jetting unit 142 is configured to include the outer injection nozzle 143a and the inner injection nozzle 143b. The outer injection nozzle 143a may provide the ice storage liquid to ice generated on the outer surface of the evaporator 122 and the inner injection nozzle 143b may provide the ice storage liquid to ice generated on the inner surface of the evaporator 122.

In general, in the structure of the evaporator provided in the ice thermal storage tank 100 according to an embodiment of the present invention, ice generated on the outer circumferential surface of the evaporator may be thicker than that formed on the inner circumferential surface of the evaporator 122.

Also, ice generated on an upper side of the evaporator 122 forming ice layers in a spiral shape may be thicker than that generated on a lower side of the evaporator 122.

Thus, in the ice thermal storage tank 100 according to an embodiment of the present invention, the circulated ice storage liquid is jetted to the uppermost portion of the evaporator 122 at the fastest velocity of flow to secure a maximum amount of ice that may be melted, namely, a maximum amount of ice that may use latent heat. In this manner, since the circulated ice storage liquid is jetted to ice, the ice storage liquid can be more rapidly cooled by the latent heat of ice, and since the ice storage liquid is more rapidly cooled, cold water can be more rapidly generated through the ice storage liquid.

Thus, when the ice storage liquid is circulated in dispensing cold water as mentioned above, cold water can be more rapidly generated and supplied to the user.

Finally, an ice storage liquid circulation operation of the ice thermal storage tank 100 according to an embodiment of the present invention will be described with reference to FIG. 7.

FIG. 7 is a schematic view illustrating the ice thermal storage tank 100 according to an embodiment of the present invention. In the tank body 110 in which an ice storage liquid is accommodated, the ice storage liquid present in the vicinity of the cold water generation unit 130 moves to the jetting unit 142 in an upper side of the evaporator 122 through the ice storage liquid exhaust pipe 144. Here, the pump 146 may move the extracted ice storage liquid from the ice storage liquid exhaust pipe 144 to the jetting unit 142.

The ice storage liquid, moved to the jetting unit 142, is jetted to the evaporator 122 and ice generated on the surface of the evaporator 122 may be melted by using a flow of the fluid. As the ice is melted, a phase thereof is changed to absorb heat from the ambient ice storage liquid, lowering the temperature of the ice storage liquid.

Also, as the ice storage liquid is jetted, the ice storage liquid distributed at an upper portion of the tank body 110 and having the lowest temperature may move to the cold generation unit 130 at a lower portion of the tank body 110.

Accordingly, a temperature of the ice storage liquid in the vicinity of the cold water generation unit 130 performing heat-exchanging to cool water flowing therein may be lowered.

In conclusion, the ice thermal storage tank 100 according to an embodiment of the present invention can have enhanced cold water generation efficiency by repeatedly circulating the ice storage liquid. In particular, as mentioned above, since the ice storage liquid is circulated when cold water is dispensed, cold water can be more quickly generated and supplied to the user.

While the present invention has been shown and described in connection with the embodiments, it will be apparent to those skilled in the art that modifications and variations can be made without departing from the spirit and scope of the invention as defined by the appended claims.

The invention claimed is:

1. An ice thermal storage tank comprising:
a tank body configured to accommodate an ice storage liquid cooled according to an ice thermal storage scheme;
a cooling device connected to the tank body and configured to cool the ice storage liquid according to the ice thermal storage scheme and comprising an evaporator in which a refrigerant flows;
a cold water generation unit configured to exchange heat between introduced water and the cooled ice storage liquid to generate cold water; and
a circulation unit configured to extract the ice storage liquid accommodated in the tank body to circulate the ice storage liquid within the tank body,
wherein the circulation unit comprises a jetting unit configured to jet the ice storage liquid to the tank body,
wherein the jetting unit is tube shaped and is disposed on an upper portion of the cooling device above a top of the evaporator of the cooling device,
wherein the jetting unit is configured such that a shape of a lower end thereof corresponds to a shape of an upper end of the evaporator to cool the ice storage liquid to generate the cold water,
wherein the jetting unit comprises a body having an inlet through which the ice storage liquid is introduced, and a plurality of injection nozzles formed on the body,
wherein the plurality of injection nozzles include at least one outer injection nozzle and at least one inner injection nozzle to provide the ice storage liquid to an outer circumferential surface and an inner circumferential surface of the evaporator, respectively, and wherein the at least one outer injection nozzle is provided on an outer line of the jetting unit and the at least one inner injection nozzle is provided on an inner line of the jetting unit.

2. The ice thermal storage tank of claim 1, wherein the circulation unit comprises a pump configured to pump the ice storage liquid to the jetting unit.

3. The ice thermal storage tank of claim 1, wherein the cold water generation unit is disposed below a bottom of the evaporator of the cooling device and is configured to connect to the tank body to cool the ice storage liquid according to the ice thermal storage scheme.

4. The ice thermal storage tank of claim 3, wherein the circulation unit comprises an ice storage liquid intake pipe configured to extract the ice storage liquid, and the ice storage liquid intake pipe is disposed between a bottom surface of the tank body and the bottom of the evaporator of the cooling device.

5. A water cooler comprising:
an ice thermal storage tank, including a tank body configured to accommodate an ice storage liquid cooled according to an ice thermal storage scheme, a cold water generation unit to generate cold water, a circulation unit configured to extract the ice storage liquid accommodated in the tank body to circulate the ice storage liquid within the tank body, and a cooling device connected to the tank body and configured to cool the ice storage liquid according to the ice thermal storage scheme and comprising an evaporator in which a refrigerant flows; and
a water dispensing unit dispensing cooled water from the ice thermal storage tank,
wherein the circulation unit comprises a jetting unit configured to jet the ice storage liquid to the tank body,
wherein the jetting unit is tube shaped and is disposed above a top of the evaporator of the cooling device,
wherein the jetting unit is configured such that a shape of a lower end thereof corresponds to a shape of an upper end of the evaporator to cool the ice storage liquid to generate the cold water,
wherein the jetting unit comprises a body having an inlet through which the ice storage liquid is introduced, and a plurality of injection nozzles formed on the body, and
wherein the plurality of injection nozzles include at least one outer injection nozzle and at least one inner injection nozzle to provide the ice storage liquid to an outer circumferential surface and an inner circumferential surface of the evaporator, respectively, and
wherein the at least one outer injection nozzle is provided on an outer line of the jetting unit and the at least one inner injection nozzle is provided on an inner line of the jetting unit.

6. The water cooler of claim 5, further comprising a temperature sensor sensing a temperature of the ice storage liquid present at a level adjacent to a bottom of the evaporator of the cooling device connected to the tank body to cool the ice storage liquid according to the ice thermal storage scheme, at a level which is above a bottom surface of the tank body of the ice thermal storage tank; and
a controller controlling a cooling function of the water cooler,
wherein the controller controls the cooling function of the water cooler based on the temperature of the ice storage liquid sensed by the temperature sensor,
wherein when the temperature of the ice storage liquid sensed by the temperature sensor is higher than a pre-set reference temperature, the controller drives the cooling device, and when the temperature of the ice storage liquid sensed by the temperature sensor is lower than the pre-set reference temperature, the controller stops driving of the cooling device, and
wherein when the cooling device is driven, the cooling device supercools the ice storage liquid.

7. The water cooler of claim 6, wherein, when the cold water is dispensed from the water dispensing unit, the controller circulates the ice storage liquid through the circulation unit included in the ice thermal storage tank.

8. The water cooler of claim 7, wherein when a cold water dispensing signal is received, the controller circulates the ice storage liquid by driving a pump included in the circulation unit, and
after a lapse of a certain amount of time or after a cold water temperature of the cold water generation unit included in the ice thermal storage tank is lowered to a certain temperature, the controller allows the cold water to be dispensed through the water dispensing unit.

* * * * *